US008111289B2

(12) United States Patent
Zruya et al.

(10) Patent No.: US 8,111,289 B2
(45) Date of Patent: Feb. 7, 2012

(54) METHOD AND APPARATUS FOR IMPLEMENTING MULTIPURPOSE MONITORING SYSTEM

(75) Inventors: Levi Zruya, Judea (IL); Haim Sibony, Lod (IL); Viatcheslav Nasanov, Victoria (CA); Amit Stekel, Rehovot (IL)

(73) Assignee: Magna B.S.P. Ltd., Doar Na Ha'Arava (IL)

( * ) Notice: Subject to any disclaimer, the term of this patent is extended or adjusted under 35 U.S.C. 154(b) by 1298 days.

(21) Appl. No.: 10/521,207

(22) PCT Filed: Jul. 15, 2003

(86) PCT No.: PCT/IL03/00585

§ 371 (c)(1),
(2), (4) Date: Jun. 27, 2005

(87) PCT Pub. No.: WO2004/008403

PCT Pub. Date: Jan. 22, 2004

(65) Prior Publication Data

US 2006/0049930 A1 Mar. 9, 2006

(30) Foreign Application Priority Data

Jul. 15, 2002 (IL) ........................................ 150745
Jan. 6, 2003 (IL) ........................................ 153813

(51) Int. Cl.
*H04N 7/18* (2006.01)

(52) U.S. Cl. ........................ 348/144; 382/106; 382/224

(58) Field of Classification Search ........................ None
See application file for complete search history.

(56) References Cited

U.S. PATENT DOCUMENTS 3,811,010 A 5/1974 Long
4,429,328 A 1/1984 Jones, Jr. et al.
4,989,084 A 1/1991 Wetzel
5,175,616 A * 12/1992 Milgram et al. ................ 348/47
(Continued)

FOREIGN PATENT DOCUMENTS

| | | |
|---|---|---|
| DE | 41 13 992 | 11/1992 |
| DE | 196 21 612 | 12/1997 |
| DE | 197 09 799 | 9/1998 |
| DE | 198 09 210 | 9/1999 |
| DE | 100 49 366 | 4/2002 |

(Continued)

OTHER PUBLICATIONS

Loaiza, H. et al, "A multi-configuration stereoscopic vision . . . ", RoMoCo '99 Proceed. of the First Workshop on Robot Motion and Control, Jun. 28-29, 1999, pp. 207-212.

*Primary Examiner* — Christopher S Kelley
*Assistant Examiner* — Christopher Findley
(74) *Attorney, Agent, or Firm* — Marsteller & Associates, P.C.

(57) ABSTRACT

Method for the monitoring of an environment, by procuring, adjourning and storing in a memory, files representing the background space. Programs for processing data obtained from the observation of objects are defined and stored in a memory, for identifying the objects and for determining whether they are dangerous. Parameters, according to which the observation of the controlled space is effected, are determined and stored. Photographic observation of the controlled space or sections thereof, is performed according to the aforesaid observation parameters. The digital data representing these photographs are processed to determine whether possible dangerous objects have been detected, and if so, these objects are classified according to the stored danger parameters.

34 Claims, 12 Drawing Sheets

U.S. PATENT DOCUMENTS

| | | | | | |
|---|---|---|---|---|---|
| 5,666,157 | A | | 9/1997 | Aviv | |
| 5,686,889 | A | | 11/1997 | Hillis | |
| 5,790,183 | A | | 8/1998 | Kerbyson | |
| 5,862,508 | A | | 1/1999 | Nagaya et al. | |
| 5,953,054 | A | * | 9/1999 | Mercier | 348/50 |
| 6,023,588 | A | | 2/2000 | Ray et al. | |
| 6,113,343 | A | * | 9/2000 | Goldenberg et al. | 414/729 |
| 6,512,537 | B1 | | 1/2003 | Shimizu et al. | |
| 6,741,744 | B1 | * | 5/2004 | Hsu | 382/229 |
| 6,954,498 | B1 | * | 10/2005 | Lipton | 375/240.08 |
| 6,970,183 | B1 | * | 11/2005 | Monroe | 348/143 |

FOREIGN PATENT DOCUMENTS

| | | |
|---|---|---|
| EP | 00379425 | 7/1990 |
| EP | 0 878 965 | 11/1998 |
| EP | 1170715 | 1/2002 |
| JP | 2001148011 | 5/2001 |
| WO | WO 94/04001 | 2/1994 |

* cited by examiner

METHOD AND APPARATUS FOR IMPLEMENTING MULTIPURPOSE MONITORING SYSTEM

FIELD OF THE INVENTION

The present invention relates to the field of target detection system. More particularly, the invention relates to a method and apparatus for detecting a foreign object in the region of a monitored environment, an object which may be unsafe or can pose a threat to said environment, such as a foreign object in the proximity of airport runways, military bases, homes industrial premises etc. For example, a foreign object in the area of airport runways may interfere with aircraft take-off and/or landing paths and endanger aircraft using said paths.

BACKGROUND OF THE INVENTION

In a multiplicity of environments it is desirable to prevent, eliminate or reduce the existence and/or the intervention of foreign objects. Such types of environment can be airport runways, military bases, home industrial premises etc. A foreign object can be a person, wildlife, birds, inanimate objects, vehicles, fire etc.

For example, in almost every airfield area Foreign Object Debris (FOD) are a major treat to aircraft during take-off from a runway or landing on a runway. FOD such as birds, wildlife or any other object on the runway region or in the air, can be easily sucked into the jet engine of an aircraft, and thereby can cause a more or less severe damage to the jet engine or to the aircraft body. Furthermore, in the worst case a bird or other FOD that has been sucked into a jet engine might cause a crash of the aircraft.

Several attempts to reduce the risk of collision with birds and other wildlife have been made by airport staff, such as frightening the birds with noisy bird scare devices and/or shooting them. However, in order to carry out such attempts, the birds must be spotted in the environment of the runways. Unfortunately, birds are hard to detect by human eyes, they are difficult and sometimes impossible to detect during the day, and are nearly invisible targets for planes at night or during low visibility.

A variety of attempts to control the bird hazard on the airfield have been made. However, such controls provide only a partial solution. An airfield check has to be done several times per hour in order to detect and deter any birds in the airfield areas. The means used for deterring birds include vehicle/human presence, pyrotechnics, and the periodic use of a trained border collie. Furthermore, airport staff is also shifting wildlife by eliminating the existence of nourishment sources such as specific type of plant, puddle, specific bugs etc., which usually attracts the wildlife. However, such nourishment sources in the airport area are relatively hard to detect, and it is required to patrol the airport area with high frequently in order eliminate such sources.

JP 2,001,148,011 discloses a small animal detecting method and a small animal detecting device which can judge an intruder, a small animal, an insect, etc., by an image recognizing means on the basis of image data picked up by a camera. However, this patent refers only to the detection of moving objects that intrude into the monitored area. Furthermore, it does not provide a method to reduce or prevent intrusion from a small animal in the future.

U.S. Pat. No. 3,811,010 discloses an intrusion detection apparatus employing two spaced-apart TV cameras having lines of observation which intersect to form a three dimensional monitored locale of interest and a TV monitor having a display tube and connected to respond to output signals from said TV cameras. The cameras and monitors being synchronized to identify the presence and location of an intruder object in said locale of interest. In another aspect the invention comparator-adder analyzing circuitry is provided between the cameras and monitor such that the monitor is actuated only when the video from both cameras is identical at a given instant. Assuming each camera is directed to observe a different background and that the focus is adjusted to substantially eliminate background signals, then only signals from the intruder object are observed and it is observed only in the monitored locale. However, this patent detects only intrusion objects and it is not directed to static or inanimate objects, and it does not provide the foreseen intruder path, the intruder size, and other useful parameters.

In some cases a radar system is used in order to detect and locate the location of targets or objects in the monitored area. However, it is extremely desirable to perform the detection without exposing the activity of the radar system.

All the methods described above, however, have not yet provided satisfactory solutions to the problem of detecting dangerous objects in the monitored area whether they are static or dynamic, and a way to reduce or eliminate future intrusion of those objects to the monitored area.

It is an object of the present invention to provide a method and apparatus for continuously and automatically detecting the presence of birds, wildlife and of any other FODs that may constitute a menace to the monitored area.

It is another object of this invention to evaluate the degree of danger posed by any detected object.

It is a further object of this invention to monitor the path of the detected dangerous objects and to predict, insofar as possible, their future path.

It is a still further object of this invention to evaluate the probability of collision between of the detected dangerous objects and any aircraft expected to take off from or land in the airfield in which the system of the invention is installed.

It is a still further object of this invention to give the alarm as to any danger revealed from the detection and the monitoring of dangerous objects and from the elaboration of the data acquired from said detection and monitoring.

It is a still further object of this invention to determine, insofar a possible, ways and means for avoiding dangers so revealed and to communicate them to responsible personnel.

It is yet another object of the present invention to provide solution for eliminating future intrusion attempts of wildlife and birds.

It is yet a further object of this invention to provide a method, for continuously and automatically detecting and finding the location of dangerous objects that may constitute a menace to the monitored area, and this without generating a radiation.

It is another object of this invention to provide an enhanced display of the detected dangerous objects.

It is yet another object of this invention to reduce the number of false alarms.

Other objects and advantages of this invention will become apparent as the description proceeds.

While the embodiments of the invention are mainly described with reference to application in airfields, they, of course, also can be used for other applications where there might be a possible problem of intrusion of persons, dangerous objects and/or vehicles into monitored areas, which usually are restricted. It is to be kept in mind that the possibility exists that dangerous objects may also not be natural ones, such as birds, but artificial ones, used for sabotage or terror operations, or a fire endangered the monitored area.

The aircraft taking off or landing on the airfield, and vehicles or persons allowed to be at the monitored area will be designated hereinafter as “authorized bodies”. All other objects, such as birds, wildlife, persons, static objects, artificial objects, fire and any other FODs will generally be called “dangerous objects”.

SUMMARY OF THE INVENTION

The method of the invention comprises the steps of:

a) procuring, adjourning and storing in a memory files representing the space above and in the vicinity of the monitored area that is to be submitted to continued observation for the detection of dangerous objects and the monitoring of their paths (which space will be called hereinafter “the controlled space”), wherein said controlled space is represented as free from any unexpected and unauthorized bodies and is therefore “the background space”;

b) defining and storing in a digital memory programs for processing data obtained from the observation of objects, for identifying said objects and determining, by the application of danger parameters, whether they are dangerous, wherein said dangerous parameters are the object size, location direction and speed of movement;

c) determining and storing parameters according to which the observation of the controlled space is effected, such as different angles, succession, frequency, resolution, and so forth. Said space may be divided into zones of different priorities, viz. zones in which the observation is carried out according to different observation parameters;

d) carrying out photographic observation of the controlled space or sections thereof, according to the aforesaid observation parameters;

e) processing the digital data representing said photographs, to determine whether possible dangerous objects have been detected, and if so, classifying said objects according to the stored danger parameters;

f) changing the sections of the said photographic observation so as to monitor the path of any detected dangerous objects;

g) receiving and storing the data defining the positions and the foreseen future path of all authorized bodies;

h) extrapolating the data obtained by monitoring the path of any detected dangerous objects to determine an assumed future path of said objects;

i) comparatively processing said assumed future path with the foreseen future path of all authorized bodies, to determine the possible danger of collision or intrusion;

j) optionally, and if possible, determining an action on the dangerous objects, such as their possible destruction or a change in their assumed future path, or an action on the authorized bodies, such as delaying the landing or take-off of an aircraft or changing their landing or take-off path, that will eliminate the danger of collision or intrusion; and k) optionally, giving alarms to responsible personnel, or general alarms, in any convenient manner and whenever pertinent information is acquired, particularly signaling the presence and nature of any dangerous objects, the danger of collisions or intrusion and possible desirable preventive actions.

According to a preferred embodiment of the invention, the method further comprises documenting the data obtained from the observation of objects, for future prevention acts.

Preferably, the future prevention acts are eliminating the existence of nourishment sources.

Preferably, the method of the present invention further comprises: a) generating a panoramic image and a map of the monitored area by scanning said area, said scanning being performed by rotating at least a pair of distinct and identical imagers around their central axis of symmetry; b) obtaining the referenced location of a detected object by observing said object with said pair of imagers, said location being represented by the altitude, range and azimuth parameters of said object; and c) displaying the altitude value of said object on said panoramic image and displaying the range and the azimuth of said object on said map.

Preferably, the imagers are cameras selected from the group consisting of: CCD or CMOS based cameras or Forward Looking Infra Red (FLIR) cameras.

The apparatus according to the invention comprises:

a) photographic devices for carrying out photographic observation of the controlled space or sections thereof, according to the aforesaid observation parameters, wherein said devices can be one or more CCD or CMOS camera and/or one or more Infra Red (IR) cameras;

b) a set of motors for changing the sections of the said photographic observation;

c) a computerized system for processing the digital data representing said photographs; and d) a memory means for storing said photographs and the processed digital data.

The memory means may comprise a single or various electronic data storage devices each of which having different addresses, such as hard disk, Random Access Memory, flash memory and the like. Such possibilities of memory means should be always understood hereinafter.

Preferably, the photographic devices are at least a pair of distinct and identical imagers.

According to a preferred embodiment of the present invention, the apparatus further comprises: a) elaborator means for obtaining the referenced location of a detected object in said controlled space, said location being represented by the altitude, range and azimuth parameters of said object; b) means for generating a panoramic image and a map of the monitored area; c) means for displaying the altitude value of said object on said panoramic image and means for displaying the range and the azimuth of said object on said map.

Preferably, the elaborator means are one or more dedicated algorithms installed within the computerized system.

According to a preferred embodiment of the present invention, the apparatus further comprises a laser range finder, which is electrically connected to the computerized system, for measuring the distance of a detected object from said laser range finder, said laser range finder transferring to the computerized system data representing the distance from a detected object, thereby aiding said computerized system to obtain the location of said detected object.

DETAILED DESCRIPTION OF PREFERRED EMBODIMENTS

Figure 1:
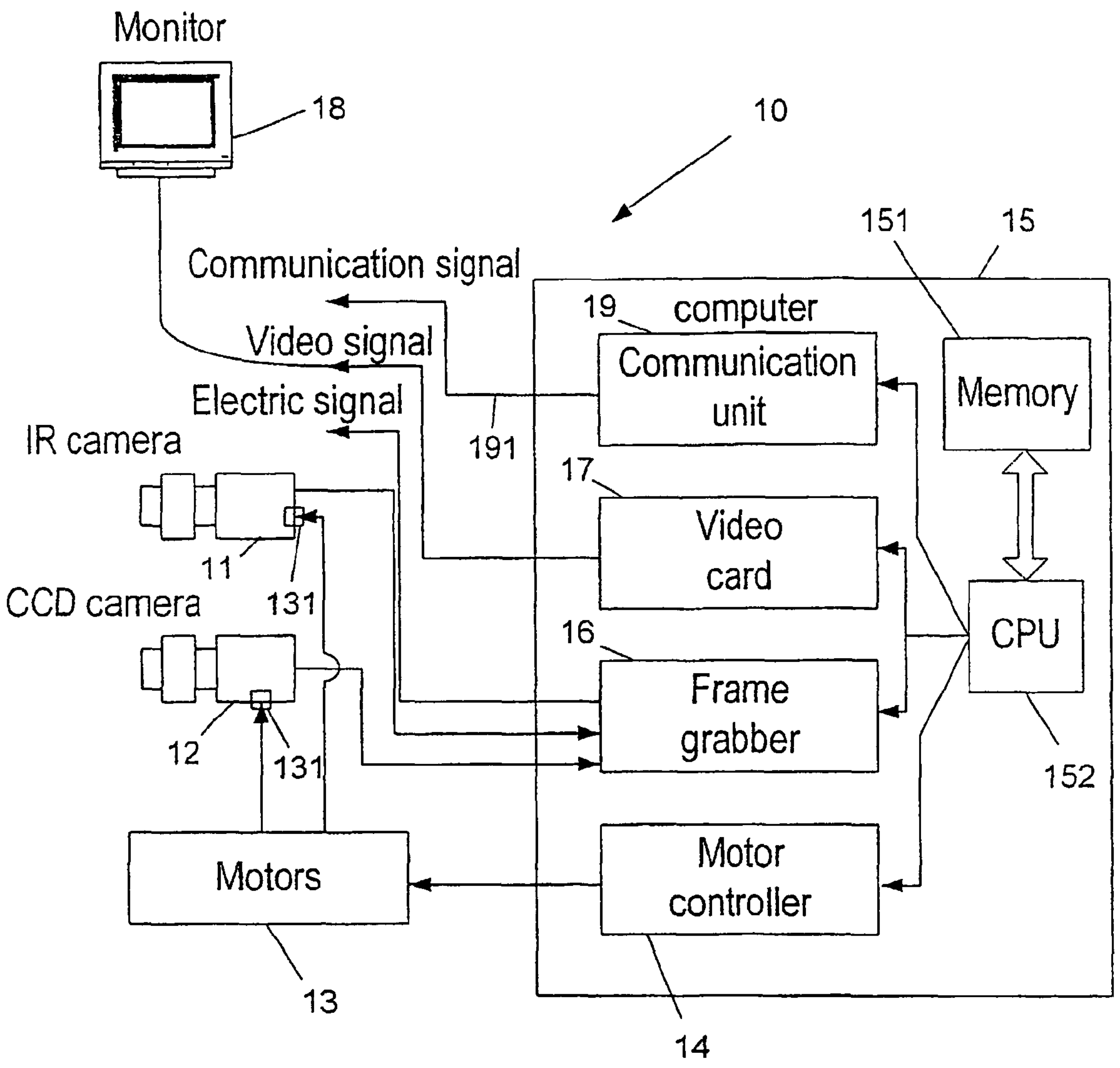
FIG. 1 schematically illustrates a monitoring system, according to a preferred embodiment of the invention.

All the processing of this invention is digital processing. Taking a photograph by a camera or a digital camera, such as those of the apparatus of this invention, provides or generates a digital or sampled image on the focal plane, which image is preferably, but not limitatively, a two-dimensional array of pixels, wherein to each pixel is associated a value that represents the radiation intensity value of the corresponding point of the image. For example, the radiation intensity value of a pixel may be from 0 to 255 in gray scale, wherein 0=black, 255=white, and others value between 0 to 255 represent different level of gray. The two-dimensional array of pixels, therefore, is represented by a matrix consisting of an array of radiation intensity values.

Hereinafter, when a photo is mentioned, it should be understood that reference is made not to the image generated by a camera, but to the corresponding matrix of pixel radiation intensities.

Preferably, each digital or sampled image is provided with a corresponding coordinates system, the origin of which is preferably located at the center of that image.

In this application, the words "photographic device" and "imager" are used interchangeably, as are the words "camera" and "digital camera", to designate either a device or other devices having similar structure and/or function.

Determination of the Background Space

To determine the background space, the controlled space must be firstly defined. For this purpose, a ground area and a vertical space must be initially defined for each desirable area to be monitored, such as runway and other airfield portions that it is desired to control, boundaries of a military base, private gardens etc.; photographic parameters for fully representing said area and space must be determined and memorized; a series of photographs according to said parameters must be taken; and the digital files representing said photographs must be memorized. Each time said area and said space are photographed and no extraneous objects are found, an updated version of said area and space—viz. of the controlled space for each monitored area portion—is obtained. Said parameters, according to which the photographs must be taken, generally include, e.g., the succession of the photographs, the space each of them covers, the time limits of groups of successive photo, the different angles at which a same space is photographed, the scale and resolution of the photos succession, and the priority of different spaces, if such exist.

Objects Evaluation Programs

Programs for identifying objects and classifying them as relevant must be defined as integral part of the system of the invention and must be stored in an electronic memory or memory address. Other programs (evaluation programs) must be similarly stored as integral part of the system of the invention to process the data identifying each relevant object and classifying it as dangerous or not, according to certain parameters. Some parameters may be, e.g., the size of the body, its apparent density, the presence of dangerous mechanical features, its speed, or the unpredictability of its path, and so on. The same programs should permit to classify the possibly dangerous objects according to the type and degree of danger they pose: for instance, a body that may cause merely superficial damage to an aircraft will be classified differently from one that may cause a crash. The evaluation programs should be periodically updated, taking into consideration, among other things, the changes in the aircraft, vehicle etc. that may be menaced by the objects and so on.

Path of Authorized Bodies

The paths that authorized bodies will follow are, of course, known, though not always with absolute certainty and precision (e.g., a path of an aircraft taking-off or landing). Whenever such paths are required during the detection process, they are identified in files stored in an electronic memory or memory address, in such a way that computer means may calculate the position of each aircraft (in plan and elevation) or each patrol at any time after an initial time. For example, in an airfield area said paths may be calculated according to the features of the aircraft and the expected take-off and landing procedure, with adjustments due to weather conditions.

Extrapolation of the Monitored Paths of Dangerous Objects

It would be extremely desirable to be able to determine, whenever required, from the data obtained by monitoring the paths of dangerous objects, their future progress and the position they will have at any given future time. Unfortunately, this will not be possible for many such objects. If the body is a living creature, such as a bird, it may change its path capriciously. Only the paths of birds engaged in a seasonal migration may be foreseen to some extent. Likewise, other objects may be strongly affected by winds. This means that the extrapolation of the monitored paths will include safety coefficients and may lead to a plurality of extrapolated paths, some more probable than others.

Documentation

It would be also extremely desirable to be able to eliminate and/or reduce the wildlife and the birds population in some monitored area, such as in the airport area. Therefore, according to a preferred embodiment of the present invention, the activities of the wildlife and the birds at that area are documented and stored in an electronic memory or memory address related to the system of the present invention. The documentation analysis can help to eliminate or reduce the wildlife and birds population in the monitored area in several ways. For example, it can help detect whether there exist nourishment sources, such as a specific type of plant, water or food in the airport area that attract wildlife or birds, then the elimination of that nourishment sources from the airport area, may reduce or eliminate that wildlife and birds from approaching and entering the airport area.

Estimating Possible Dangers of Collision

Once the paths of all authorized bodies are known and the paths of dangerous objects have been extrapolated as well as possible, it is a simple matter of calculation, easily within the purview of skilled persons, to assess the possible dangers of collision.

Actions for Eliminating the Danger of Collision

Such actions may be carried out on the dangerous objects, and in that case they are their destruction or a change in their assumed future path: in case of birds, they may be scared off out of the surrounding of the monitored area. If they are actions on the authorized bodies, they may be delaying—if not denying—their landing or take-off or changing their landing or take-off path. Such actions are outside the system of the invention and should be carried out by the airfield or airline authorities; however the system will alert said authorities to the danger of collision and at least suggest possible ways of eliminating it and/or the system will generates an output signal for automatically operating wildlife scaring devices. It should be emphasized that the time available for such actions is generally very short, and therefore the input of the system of the invention should be quick, precise and clear.

An embodiment of an apparatus according to the invention will now be described by way of example.

FIG. 1 schematically illustrates a monitoring system 10, according to a preferred embodiment of the invention. System 10 comprises at least one photographic device, such as Charged Coupled Device (CCD) camera 12 and/or thermal camera 11 (i.e., Infra Red camera), motors 13 and a computerized system 15.

Each photographic device can provide either color image or uncolored image. Preferably, but not limitatively, at least one of the photographic devices is a digital camera. Of course, each photographic device may have different type of lenses (i.e., each camera may be provided with lenses having different mechanical and/or optical structures). The photographic devices are used to allow the observation of objects at the monitored area.

The computerized system 15 is responsible for performing the processing required for the operation of this invention as described hereinabove. The computerized system 15 receives, at its inputs, data from active cameras that are attached to system 10 (e.g., CCD camera 11, thermal camera 12, CMOS based camera, etc). The data from the cameras is captured and digitized at the computerized system 15 by a frame grabber unit 16. As aforementioned, the computerized system 15 processes the received data from the cameras in order to detect, in real-time, dangerous objects at the monitored area. The processing is controlled by controller 151 according to a set of instructions and data regarding the background space, which is stored within the memory 151. The computerized system 15 outputs data regarding the detection of suspected dangerous objects to be displayed on one or more monitors, such as monitor 18, via its video card 17 and/or to notified other systems by communication signals 191 that are generated from communication unit 19, such as signals for a wildlife scaring device, airport operator static computers, wireless signals for portable computers etc.

One or more of the cameras attached to system 10 is rotated by motors 13 horizontally (i.e., pan) and/or vertically (i.e., tilt). Typically, the motors 13 are servomotors. The rotation of the cameras is required for scanning the specific runway environment. In order to determine the angle of the camera, two additional elements are provided to each axis that rotates a camera, an encoder and a reset reference sensor (both elements shown as unit 131 in FIG. 1). The reset sensor provides, to the computerized system 15, the initiation angle of the camera at the beginning of the scanning, and the encoder provides, to the computerized system 15, the current angle of the camera during the scanning. Motion controller 14 controls motors 13 and in addition it also controls the zoom capabilities of the attached cameras, such as cameras 11 and 12. Motion controller 14 can be located within the computerized system 15 or it can remotely communicate with it. Motion controller 14 communicates with the attached cameras and the computerized system 15 by a suitable communication protocol, such as RS-232.

According to a preferred embodiment of the present invention, each camera attached to the system 10 constantly scans a portion or the entire environment. For a typical camera model (e.g., Raytheon commercial infrared series 2000B controller infrared thermal imaging video camera, of Raytheon Company, U.S.), which is suitable to be attached to system 10, it takes about 15 seconds to scan the complete monitored environment that is covered by it. The scanning is divided into several and a constant number of tracks, upon which each camera is focused. The preferred scanning area is preformed at the area ground up to a height of, preferably but limitatively, two hundred meters above the area ground and also at a distance of a few kilometers, preferably 1 to 2 Km, towards the horizon. Preferably but limitatively, the cameras of system 10 are installed on a tower (e.g., flight control tower) or on other suitable pole or stand, at a height of between 25 to 60 meters above the desired monitored area ground.

The cameras can be configured in a variety of ways and positions. According to one preferred embodiment of the invention, a pair of identical cameras is located vertically one above the other on the same pole, so that the distance between the cameras is approximately between 1 to 2 meters. The pole on which the camera are located can be a pivot by a motor, thus on each turn of the pole, both of the cameras are moved together horizontally. In such a configuration the cameras scans a sector, track or zone simultaneously. Preferably, but not limitatively, the distance between a pair of cameras is between 0.5 to 50 meter, horizontally, vertically or at any angle. The cameras or imagers may be un-identical and may have different central axis of symmetry or of optical magnification, provided that they have at least an overlapping part of their field of view.

Figure 2:
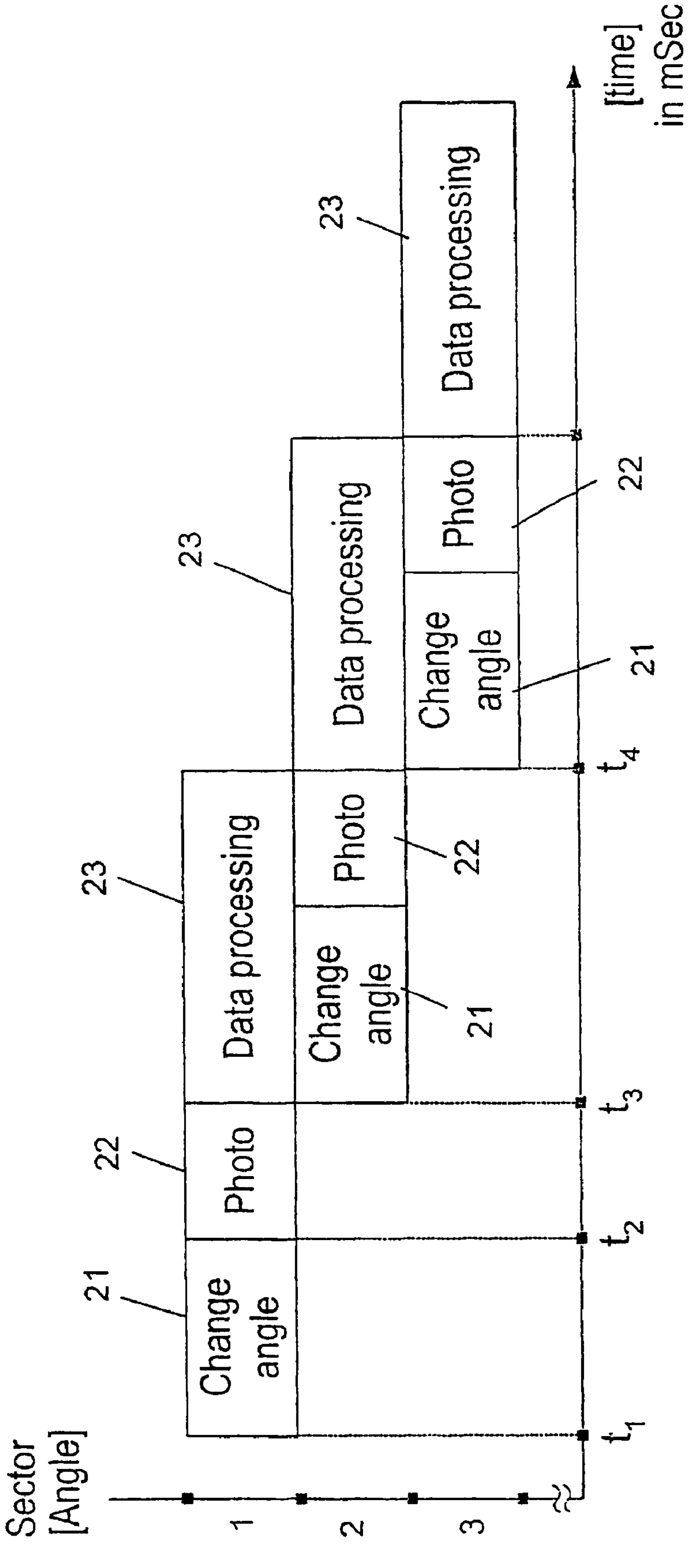
FIG. 2 schematically illustrates in a graph form a method of photographing the sequence of photos.

FIG. 2 schematically illustrates in a graph form an example for the method of photographing a sequence of photos of the environment by system 10 (FIG. 1), according to a preferred embodiment of the invention. At each new angle of the camera attached to system 10, several photos are taken, preferably, about 30 photos. The angle of the camera is modified before each photo or sequence of photos is taken by motors 13 and motor controller 14, as described hereinbefore. At the same time when the modification occurs, the camera zoom is changed, by the computerized system 15, in accordance with range of the scanned section. The time it takes for the camera to change its current angle to a new angle position is shown by item 21 and it refers to the time from t1 to t2, which is preferably but not imitatively less than 300 msec. After obtaining the new angle, the camera takes the sequence of photos (shown by item 22) at a time period, which should be as short as possible, preferably, shorter than one second (i.e., the time from t2 to t3). Finally, at the time period from t3 to t4, two things happen:

firstly, the data of the last taken photo or sequence of photos is processed by the computerized system 15, and secondly, items 21 and 22 are repeated, but the camera is now at its new angle.

The aforementioned acts are repeated constantly along and above the desirable monitored area, which is covered by the camera. The scanning of the environment by each camera is performed either continuously or in segments.

Of course, when using at least two CCD cameras each of which are located at same view angles but at a distance from each other and/or at least two Infra Red cameras each of which are located at the same view angles but also at a distance from each other, additional details on a suspected dangerous objects can be acquired. For example, the additional details can be the distance of the object from the cameras, the relative spatial location of the object at monitored area, the size of the object etc. Using a single camera result in a two-dimension (2-D) photo, which provides less details, but when using, in combination, 2-D photos from two or more cameras, depth parameters are obtained (i.e., three-dimension like). Preferably but not limitatively, when using at least two cameras of the same type, both turn aside and/or are elevated together, although the angle of perspective is different. Furthermore, the fact that the objects are obtained from at least two cameras, it enables to elongate the detection range, as well as to reduce the false alarm rate. Preferably, but not limitatively, the distance between a pair of cameras is between 0.5 to 50 meter, the distance can be horizontally, vertically or at any angle.

Figure 3:
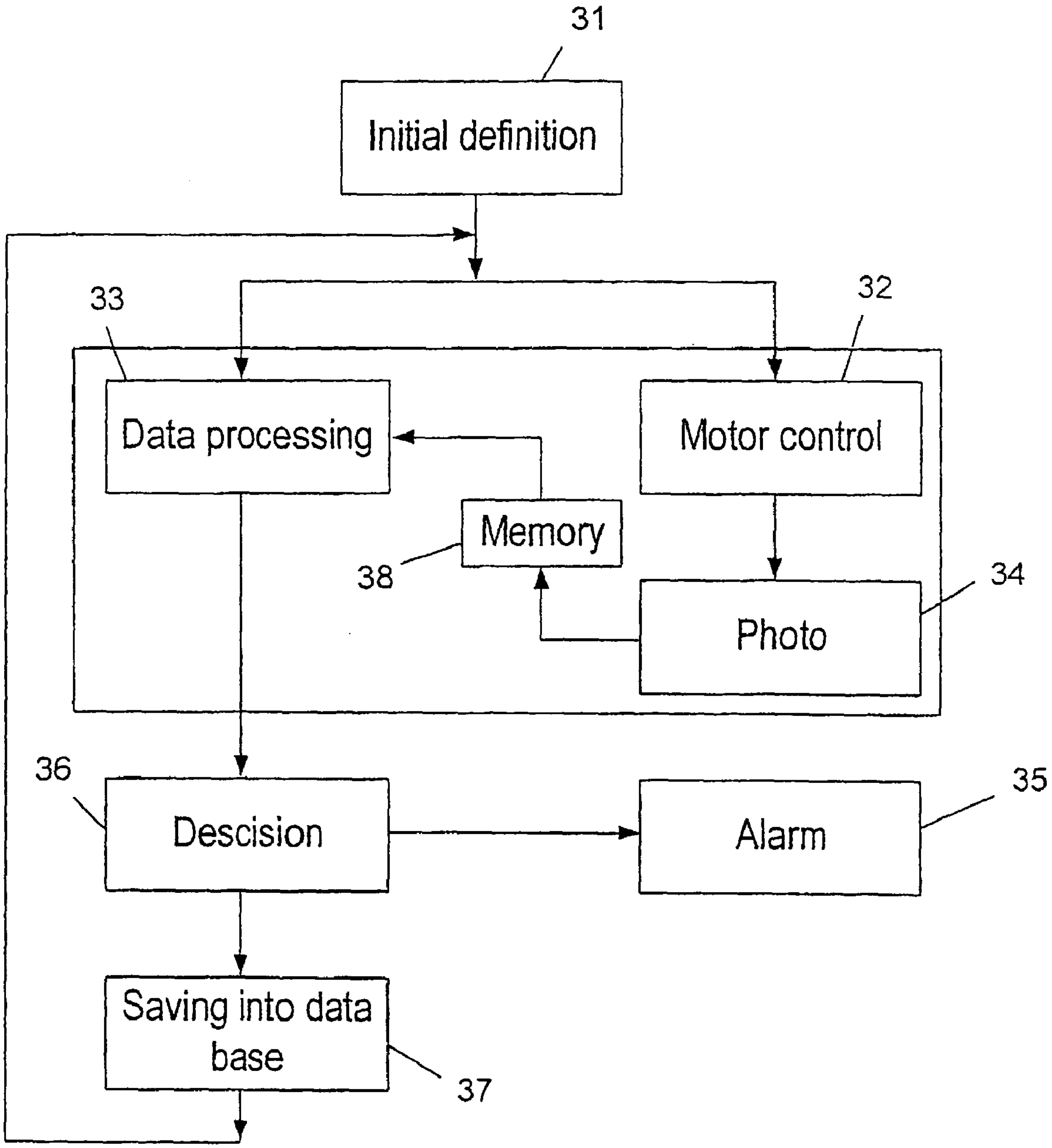
FIG. 3 is a flow chart that shows the algorithm of a system for monitoring the runway.

FIG. 3 is a flow chart that shows an example of the program algorithm of system 10 (FIG. 1) for monitoring the desired area by using two IR cameras, according to a preferred embodiment of the present invention. The flow chart starts at block 31, wherein the initial definitions for the scanning and the processing are set. The initial definitions are parameters that are required for the operation of system 10. For example, one or more parameters that define the camera model, the initial camera angle, definition regarding the area (such as, loading the airport map or military base map), etc. In the flow chart blocks 32 to 34 and block 38 describe the implementation of the graph description in FIG. 2. At the next step, block 32, the computerized system 15 orders the motion controllers 14 to change the angle of the one or more camera. Then in the next step, block 34, the computerized system 15 orders the cameras (via motor controller 14) to take the sequence of photos, preferably about 25 to 30 photos a second. The photos are stored in the memory 151 (FIG. 1) as shown by block 38.

At the next step 33, the data of the photos are processed; this step is part of the evaluation programs. The data processing in step 33 is performed in two stages. Firstly, pixel processing is performed and then, secondly, logical processing is performed. Both data processing stages, the pixel and the logical, will be described hereinafter.

At the next step 36, which is also part of the evaluation programs, after the processing has been completed, computerized system 15 decides whether a detected object is a dangerous object. If a dangerous object is detected, then at the next step 35, a warning signal is activated, such as showing the location of the object on the monitor 18 (FIG. 1), activating an alarm, etc. If computerized system 15 makes a decision that no dangerous body exists, then in the next step 37, the last process data is stored in a related database. The stored data is used for updating the aforementioned background space. The background space is used during the pixels processing stage, in order to exclude from each processed photo one or more objects which are non-dangerous bodies but appear to be during detection. For example, the entire region that is covered by a tree that moves when the wind blows is excluded from the photo.

Figure 4:
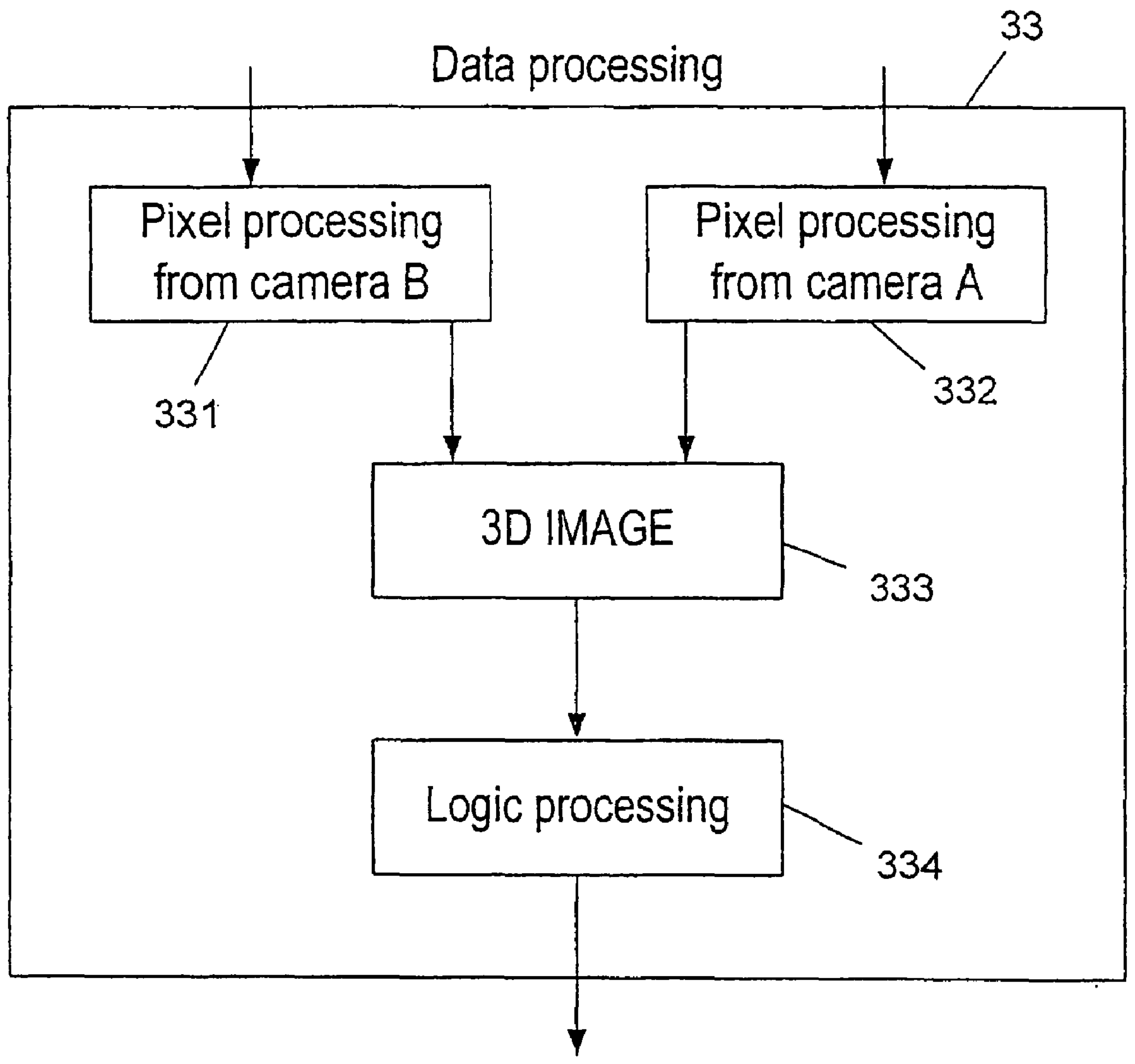
FIG. 4 schematically illustrates the data processing of the algorithm of FIG. 3.

As aforementioned, the data processing (block 33 of FIG. 3) is done in two stages. The following is a description of the two processing stages:

In the pixels processing stage, each pixel in each photo from the sequence of photos is mathematically processed from each camera that provide photos at same time period (e.g., as shown by elements 331 and 332 of FIG. 4A). The mathematical process is based on Gaussian curve (FIG. 6) that is generated from a continuous measurement of pixels from previous photos, wherein the location of each pixel of the current photo is compared with a threshold value (e.g., threshold 61 as shown in FIG. 6) that is dynamically calculated along the operation of system 10. The threshold value dynamically corresponds to the danger degrees. The pixels processing detects either moving objects or static objects, as described hereinafter regarding FIGS. 5A and 5B. After the mathematical process is done, and one or more suspected dangerous objects are detected (i.e., pixels that their location on the Gaussian curve exceed the current threshold), a three-dimension (3-D) like data on the suspected object is calculated by system 10. The 3-D like data represents further parameters regarding the suspected object. The 3-D like data is generated from at least two cameras, by using the triangulation method (e.g., the distance of the suspected object is calculated from the parameters of the distance between the two cameras and the angle of each camera from which the 2-d photo has been taken). The 3-D data is used for detecting pixels that may represent objects such as, a relatively small or distant dangerous body, a part of a larger or closer dangerous body in a photo etc. For example, a bird in a flock of birds may appear as a single pixel in the photo, but due to their direction of flight, system 10 defines them as birds, even if each of the birds appears as a single pixel. In addition to the above mathematical calculation method, whenever there are suspected dangerous objects on the ground, system 10 find their location by comparing the photo of the suspected object with the previous stored image of that specific area. According to the calculated difference between those photos at the region of the suspected object, system 10 will determine if the suspected object is a dangerous object, or not. In addition, objects which will disappear or will not have logical path, will be rejected as false alarms.

In the logic processing stage, the detected pixels that may represent a dangerous object (i.e., the suspected objects) are measured by using different parameters, in order to decide whether they are dangerous or not. The measured parameters are compared to a predetermined table of values that corresponds to the measured parameters. The predetermined table of values is stored in memory 151 or other related database. For example the measured parameters can be:

1. The dimension of the suspected object, its length and its width (e.g., length=3 pixels and width=2 pixels), if it size is more then one pixel. An object can be an adjacent group of pixels.
2. The track of the suspected object in relation to the monitored area, as were created in the logic matrix.
3. Movement parameters, such as direction that was created from one or more pixels, velocity etc.

According to a preferred embodiment of the invention, in case system 10 detects one or more dangerous objects, at least one camera stops scanning the area and focuses on the detected dangerous objects. In addition to the storing of the taken photos, during the detection process at the data processing stage (block 33 of FIG. 3) the system also stored an event archive in the memory of system 10. The event archive contains data and/or photos regarding the dangerous objects that were detected.

Figure 5A:
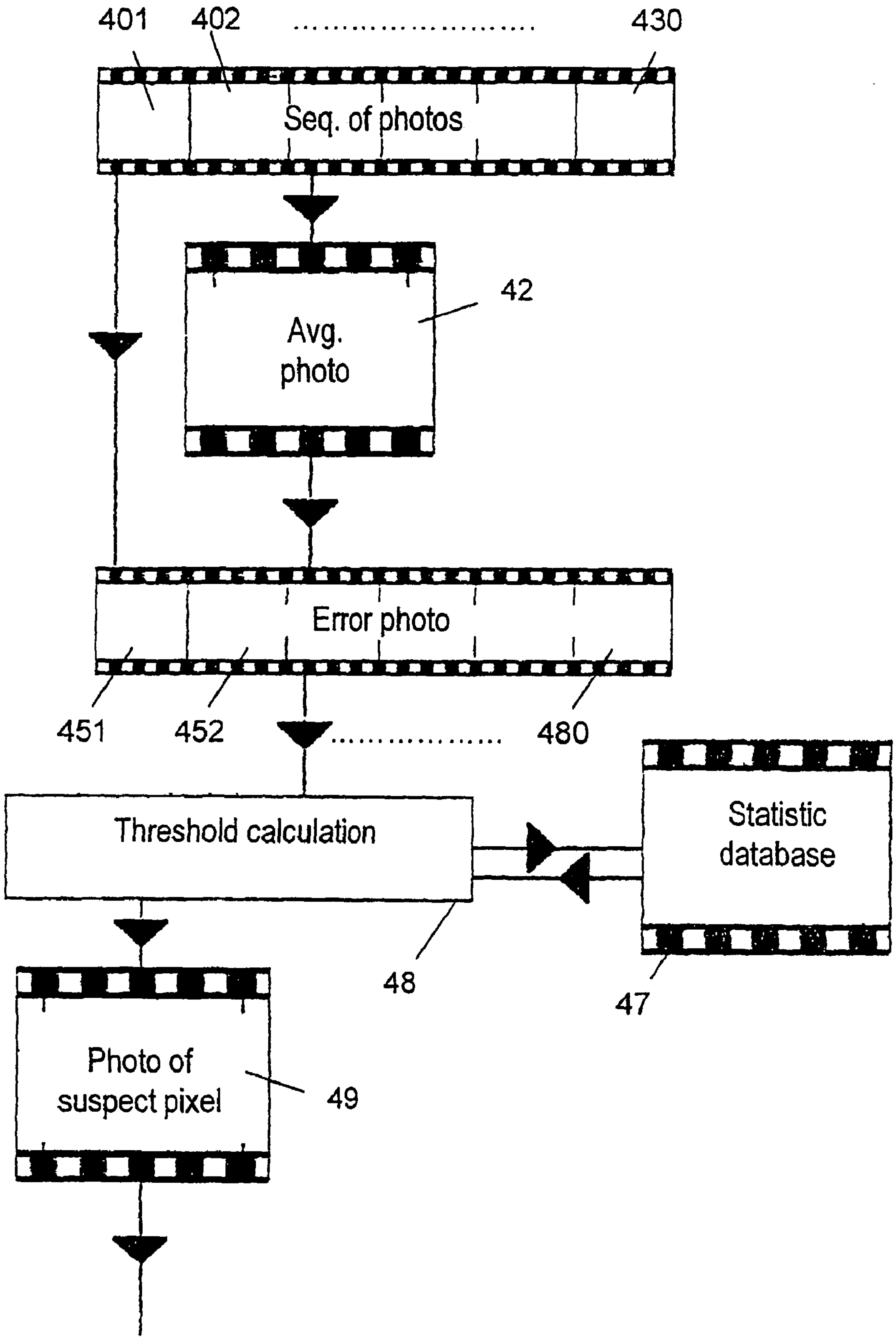
FIG. 5A schematically illustrates the detection of moving objects in the data processing of FIG. 4.
Figure 6:
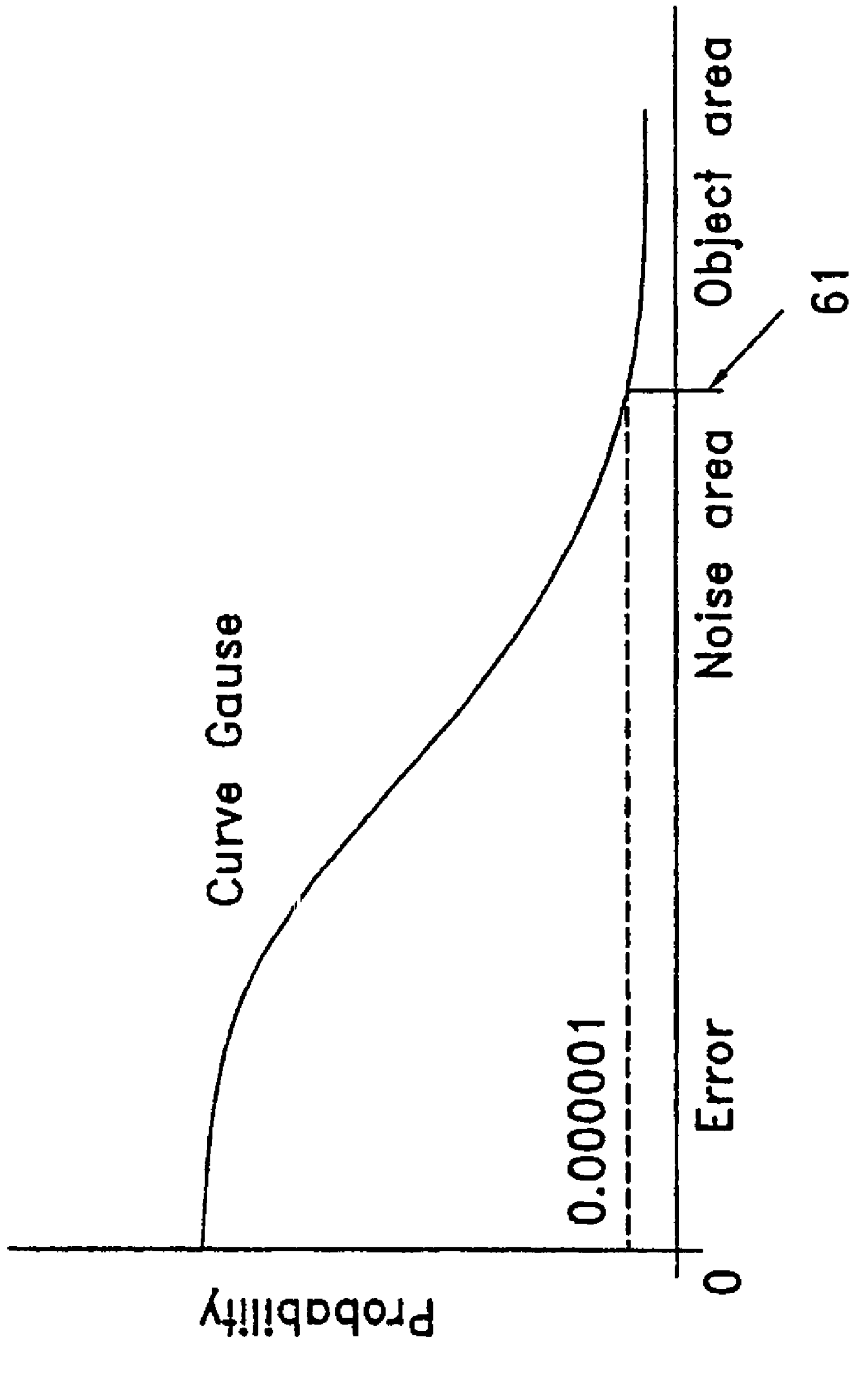
FIG. 6 schematically illustrates in a graph form the threshold level used for the detection of moving and static objects.

FIG. 5A schematically illustrates the detection of a moving object at the pixel processing stage, according to the preferred embodiment of the invention. The detection of a moving object is done as follows:

Each taken photo 401 to 430 from the current sequence is compared to an average photo 42. Photo 42 is an average photo that was generated from the previous stored sequence of photos that was taken at the exact camera angle as the current taken sequence of photos 401 to 430.

A comparison sequence of photos 451 to 480 is generated from the difference in the pixels between the average photo 42 and each photo from the current sequence of photos 401 to 430. Each pixel in photos 451 to 480 represents the error value between photos 401 to 430 and photo 42.

Each error value is compared to a threshold level 61 (FIG. 6) in the threshold calculation unit 48. The threshold level 61 is dynamically determined to each pixel in the photo matrix statistically according the previous pixel values stored in the statistic database 47. Whenever a pixel value in each error photo 451 to 480 exceeds the predetermined threshold level 61, the location of the exceeded pixel is set to a specific value in a logic matrix 49 that represent the suspected photo (e.g., the pixel is set as value of 255, wherein the other pixels value is set to 0).

After the completion of the threshold stage for the entire current sequence of photos, the generated logic matrix 49 that contains the suspected pixels is transferred to the logic process stage, wherein the suspicious pixels are measured as described hereinbefore.

Figure 5B:
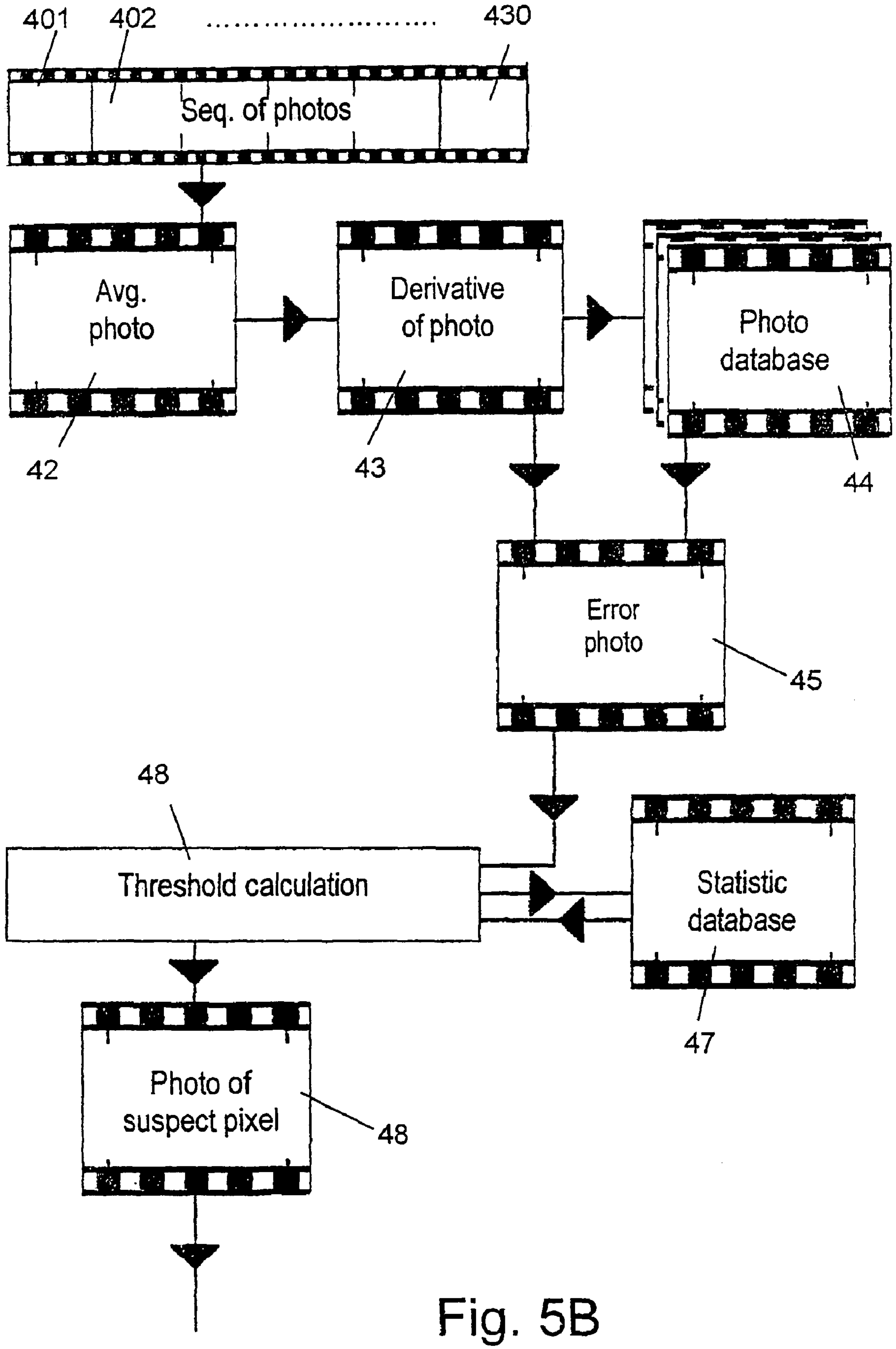
FIG. 5B schematically illustrates the detection of static objects in the data processing of FIG. 4.

FIG. 5B schematically illustrates the detection of a static object at the pixel processing stage, according to the preferred embodiment of the invention. The detection of a static object is done as follows:

An average photo 42 is created from the current sequence of photos 401 to 430.

A derivative matrix 43 is generated from the average photo 42. The derivative matrix 43 is used to emphasize relatively small objects in the photo, which might be potential dangerous objects. The derivative eliminates relatively large surfaces from the photo, such as shadows, fog etc.

The generated derivative matrix 43 is stored in a photo database 44 (e.g., memory 151 or other related database), and it is also compared with a previous derivative matrix, stored in database 44, of a photo that was taken from the exact camera angle of the current photo. From the comparison, an error photo 45 is generated. Each pixel in photo 45 represents the error value between matrix 43 and the matrix from database 44 that it was compared to.

Each error value is compared to a threshold level 61 (FIG. 6) in the threshold calculation unit 48. The threshold level 61 is dynamically determined to each pixel in the error photo 45, statistically according the previous corresponding pixel values stored in the statistic database 47. Whenever a pixel value in the error photo 45 exceeds the predetermined threshold level 61, the location of the exceeded pixel is set to a specific value in the logic matrix 49 (e.g., the pixel is set as value of 255, wherein the other pixels value is set to 0).

After the completion of the threshold stage for the entire error photo, the generated logic matrix 49 that contains the suspected pixels is transferred to the logic process stage, wherein the suspicious pixels are measured as described hereinbefore.

Of course, the method and apparatus of the present invention can be implemented for other purposes, such as for the detection of dangerous objects approaching the coast line from the sea. In this case, the approach by someone swimming or by a vessel such as boat traveling on water can be detected. The system 10 traces the path of the dangerous objects and its foreseen direction, and preferably sets off an alarm whenever a dangerous object approaches the coast line. In this implementation, the authorized bodies can be, for example, a navy boat that patrols along a determined path.

In another example, system 10 is used for detecting burning in coal stratum. Sometimes burning in a coal stratum or pile occurs beneath the coal stratum or piles. This is usually hard to detect. When the surface area of the stratum or pile heats up by emitting warm air, an IR camera such as those used by the present invention can easily detect. Whenever such burning occurs, it is desirable to detect the burning at the very start. The implementation system 10 for detecting burning in coal stratum will allow the detection of combustion at the burning at the very beginning, pinpointing the exact location at which it occurs, its intensity, the size of the burning area, the spread direction of the burning, the rate of the spreading etc.

According to another preferred embodiment of this invention, system 10 (FIG. 1) is used as a system for detecting targets and their location and this without generating radiation (i.e., a passive electro-optical radar). Preferably, the location of the targets is given in polar coordinates, e.g., range and azimuth.

In this embodiment, system 10 (FIG. 1) is used to measure and provide the location (i.e., the location of the object in a three-dimensional coordinates system) of a detected object, such as the range, azimuth and altitude of the object. The location is relative to a reference coordinates system on earth. The location of the object in the three-dimensional coordinates system is obtained due to an arrangement of at least two imagers, as will be described hereinafter. Preferably, the imagers are digital photographic devices such as CCD or CMOS based cameras or Forward Looking Infra Red (FLIR) cameras.

Preferably, at least a pair of identical CCD cameras, such as camera 12 of FIG. 1 and/or pair of FLIR cameras, such as camera 11 of FIG. 1 are positioned in such a way that system 10 sees each object, as it is captured by the charged coupled device of each camera, in two distinct projections. Each projection represents an image that comprises a segment of pixels wherein the center of gravity of a specific object in the image has specific coordinates, which differ from its coordinates in the other projection. The two centers of gravity of the same object have the pixel coordinate system (x1, y1) for the first camera and the pixel coordinate system (x2, y2) for the second camera (e.g., each coordinate system can be expressed in units of meters).

According to this embodiment, system 10 (FIG. 1) essentially comprises at least two cameras preferably having parallel optical axes and having synchronous image grabbing. A rotational motion means such as motor 13 (FIG. 1) and image processing means, as described hereinabove. The image processing means is used to filter noise-originated signals and extract possible targets in the images and determine their azimuth, range and altitude according to their location in the images and the location disparity (parallax) in the two images coming from the two cameras (e.g., two units of CCD camera 12 (FIG. 1).

Figure 7:
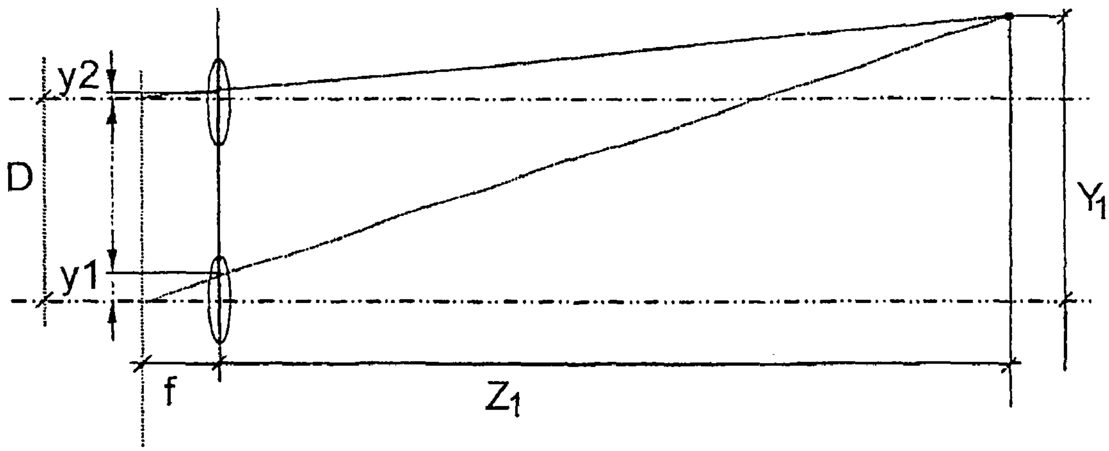
FIG. 7 schematically illustrates the solving of the general three dimensional position of an object in the Y direction.

Obtaining the general location of an object in an image is identical for both directions X and Y of the coordinates system. FIG. 7 schematically illustrates the solving of the general three-dimensional position of an object in the Y direction.

Thus, solving the coordinate for the three-dimensional coordinates system is obtained as follows:

At first, the two following equations are provided, $$\frac{y_2}{f} = \frac{Y_l - D}{Z_l}. \quad (1)$$

$$\frac{y_1}{f} = \frac{Y_l}{Z_l} \quad (2)$$

solving for Z1 and Y1, we get:

$$Z_l = \frac{D * f}{\Delta y} \quad \Delta y \equiv y1 - y2. \quad (3)$$

$$Y_l = \frac{y_1}{f} * Z_l = \frac{y_1 * D}{\Delta y}. \quad (4)$$

and the same for X1:

$$X_l = \frac{x_1}{f} * Z_l = \frac{x_1 * D}{\Delta y} \quad (5)$$

wherein,

D—distance between the cameras optical axes;

f—focal length of the camera lenses;

(x1, y1)—coordinates of the target projection onto the first camera detector array;

(x2, y2)—coordinates of the target projection onto the second camera detector array;

(X1, Y1, Z1)—coordinates of the target in the local coordinate system; and (X, Y, Z)—coordinates of the target in the general world coordinate system.

Due to the fact that the system 10 (FIG. 1) is scanning with the two cameras a certain sector, each scan step has a certain azimuth angle α which is dissimilarity with the system initial position. The system initial position represents the general world coordinate system. The magnitude of the angle α is used for correcting the dissimilarity by rotating the local step coordinates system thus that it will match the general world coordinate system.

In other words, the coordinates of an object in the local coordinate system differ from the coordinates of that object in the general world coordinate system. Thus, the transformations from the local coordinate system to the general world coordinate are calculated as follows:

$$X = X_1 * \cos\alpha - Z_1 * \sin\alpha$$

$$Y = Y1$$

$$Z = X_1 * \sin\alpha + Z_1 * \cos\alpha \quad (6)$$

This covert detection and localization of dangerous objects embodiment provides a passive operation of system 10 (FIG. 1) by imaging optical radiation in the far infrared range that is emitted by the relatively hot targets, such as an airplane, helicopter, boat, a human being or any other object. This embodiment further provides a passive operation of system 10 (FIG. 1) by imaging optical radiation in the near infrared or vision ranges that is reflected by said targets.

Figure 8:
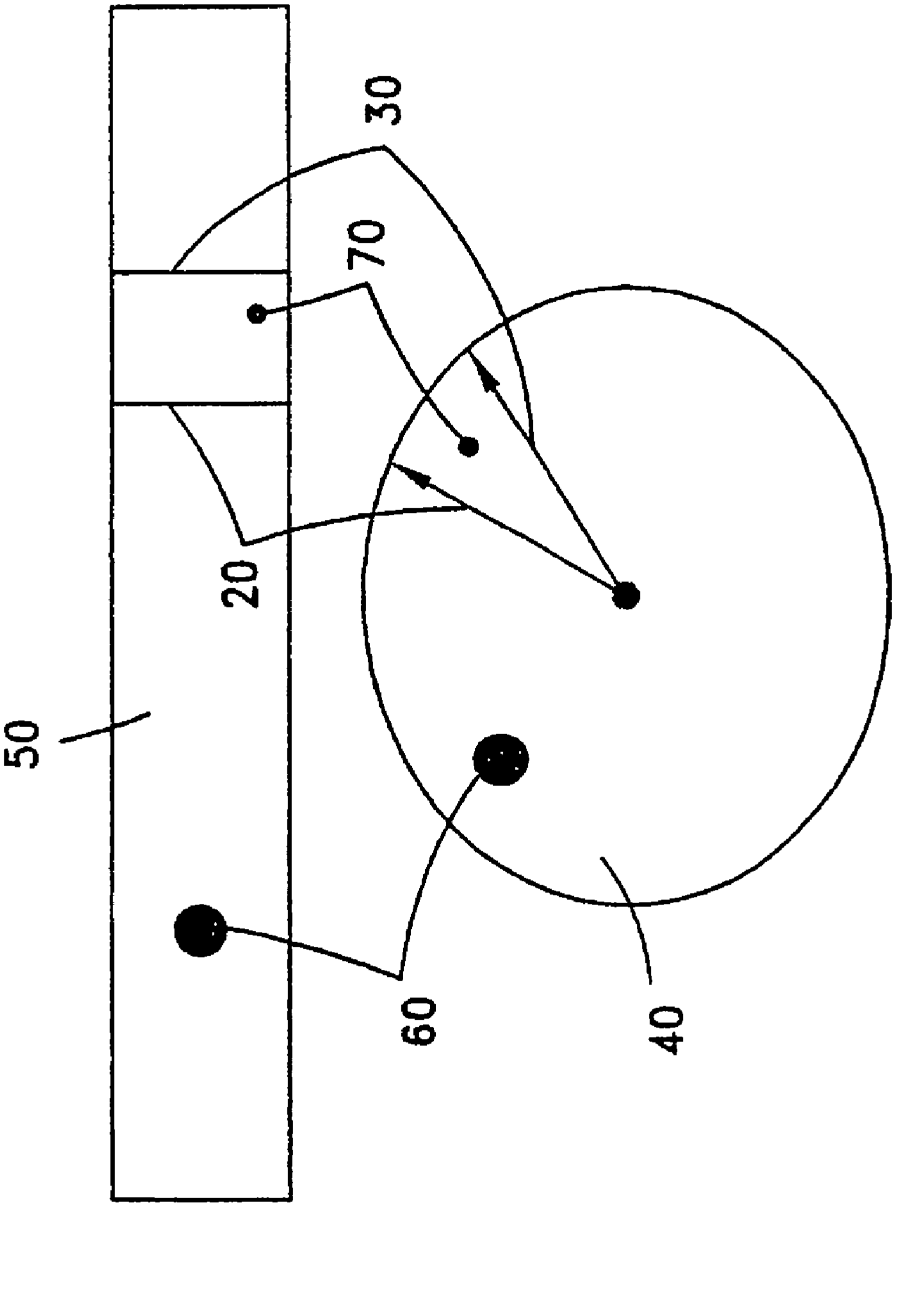
FIG. 8 schematically illustrates a combined panoramic view and map presentation of a monitored area.

In this embodiment, system 10 (FIG. 1) generates, by elaborator means, a panoramic image of the scene (i.e., of the monitored area) by rotating the pair of cameras around their central axis of symmetry, as well as a map of the detected targets in the scene that is regularly refreshed by the scanning mechanism of system 10. The combination of a panoramic image aligned with a map of the detected targets (i.e., dangerous objects) form a three-dimensional map of the targets, as shown in FIG. 8. Preferably, the elaborator means consisting of the computerized system 15 and one or more dedicated algorithms installed within it, as will known to a person skilled in the art.

Reduction of the number of false alarm is also achieved by the reduction of clutter from the radar three-dimensional map. This is done, as has already been described hereinabove, by letting system 10 (FIG. 1) assimilate the surrounding response, coming from trees, bushes, vehicles on roads and the like and reducing the system response in these areas accordingly, all in an effort to reduce false alarms.

System 10 (FIG. 1) scans the monitored area by a vertical and/or horizontal rotational scanning of the monitored area. The vertical rotational scanning is achieved by placing the system axis of rotation perpendicular to the earth and the scanning is done over the azimuth range, which is the same as that done in typical radar scanning. The horizontal rotational scanning is achieved by placing the system axis of rotation horizontal to the earth and the scanning is done over elevation angles. These two last distinctions are needed in different situations in which the target exhibits certain activities that call for such scanning. Of course, by adding more than two imager means (e.g., such as three or four CCD cameras), the accuracy of the range measurement is increased.

FIG. 8 schematically illustrates a combined panoramic view and map presentation of a monitored area. In FIG. 8, the electro-optical radar (i.e., system 10 of FIG. 1) is scanning with a viewing angle confined by the two rays, 20 and 30. The radar display is arranged in a graphical map presentation, 40, and a panoramic image 50. In the map, the relative locations of the targets, 60 and 70, can be seen, while in the panoramic image, 50, the heights of the targets can be seen. The displayed map and panoramic image are both refreshed with the radar system rotational scanning. The combination of a panoramic view, providing altitude and azimuth, with a map, providing azimuth and range, gives a three-dimensional map of targets. Preferably, the position of each detected object being displayed by using any suitable three-dimensional software graphics, such as Open Graphic Library (OpenGL), as known to a skilled person in the art.

Using two FLIR cameras positioned on the system vertical axis and two additional video cameras (e.g., CCD cameras), operating in the normal vision band, located horizontally from the two sides of the system vertical axis, the different camera types are optimal on different conditions: the FLIRS are optimal at night and in bad weather and the video cameras are optimal in the daytime and in good weather.

Figure 9:
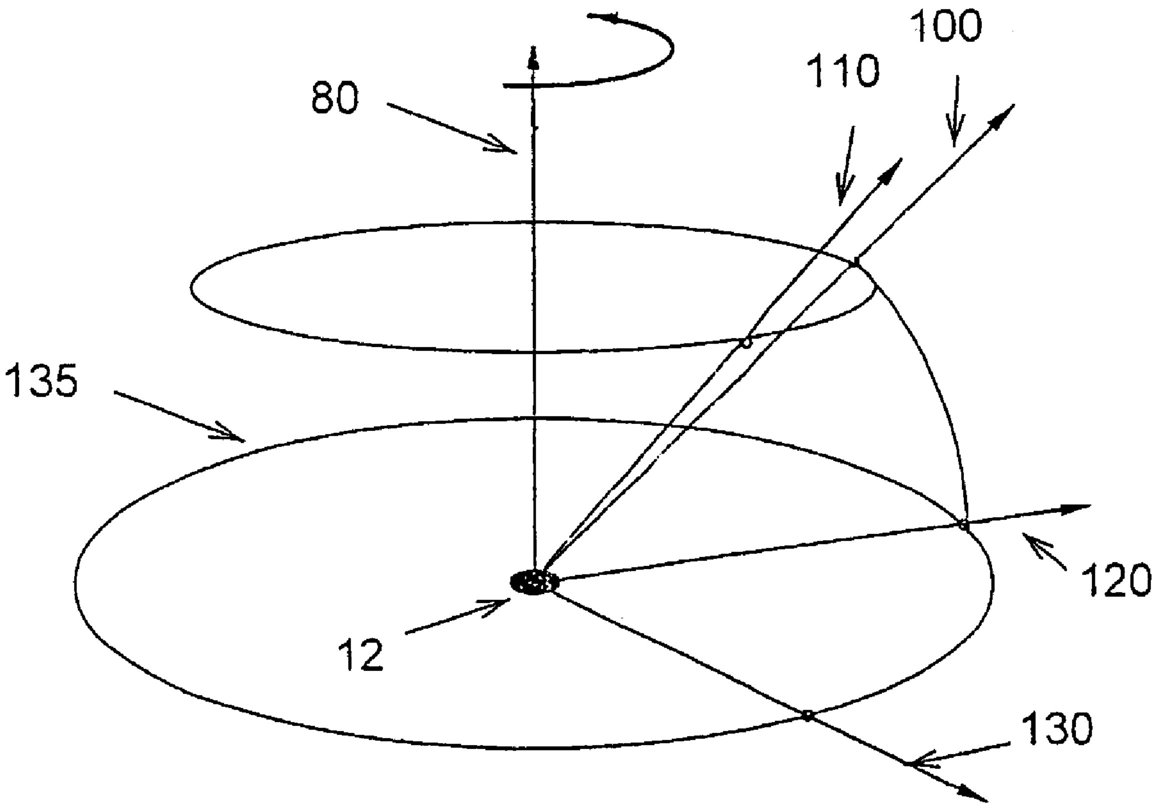
FIG. 9 schematically illustrates a scanning of a sector around a vertical rotation axis.

In FIG. 9, the pair of cameras 12 of the electro-optical radar embodiment of system 10 (FIG. 1) is rotating around the vertical rotation axis 80 and providing an image of scene, which is confined between the rays 100, 110, 120 and 130. The provided image of the scene is analogous to a radar beam, thus while the cameras are rotating around axis 80, the beam is scanning through the entire sector 135.

Figure 10:
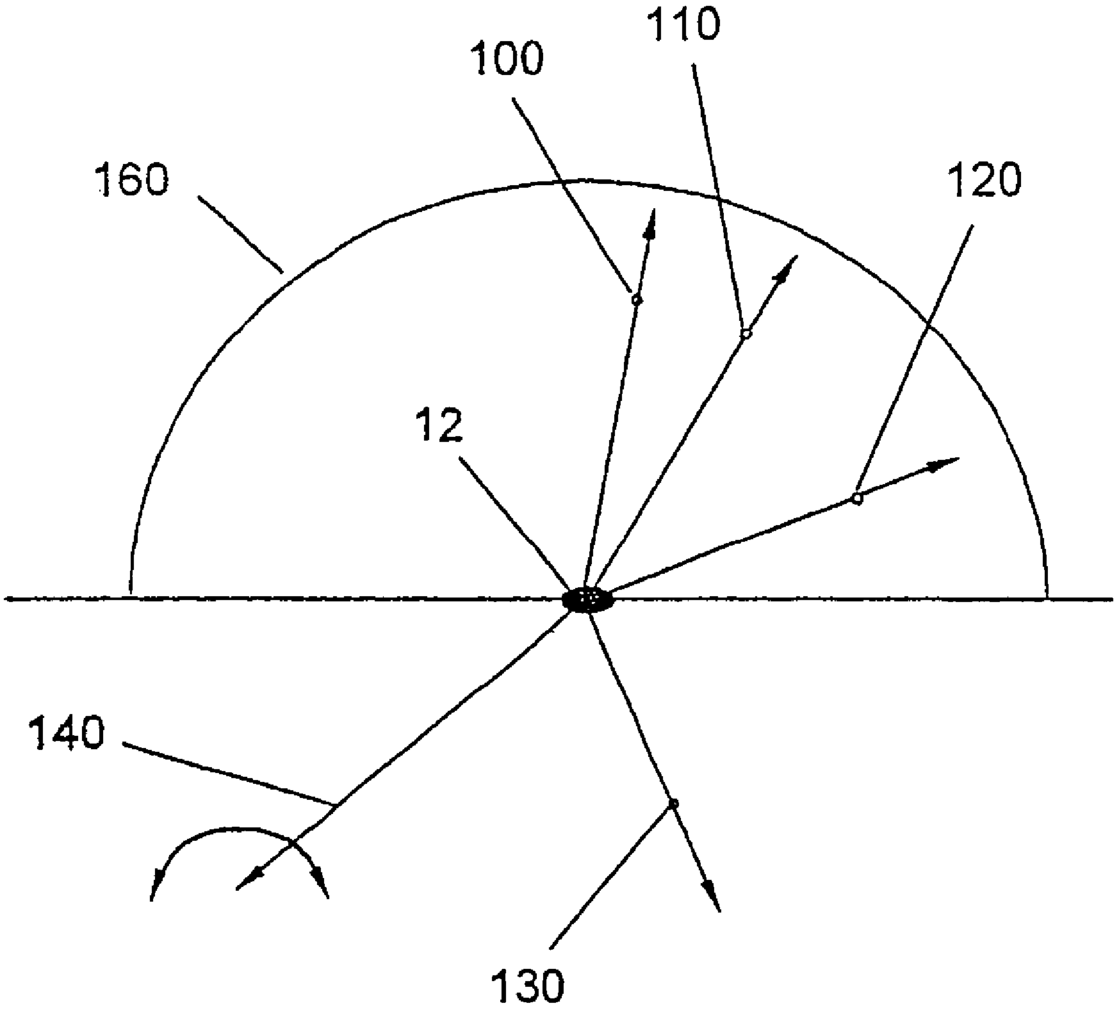
FIG. 10 schematically illustrates a scanning of a sector around a horizontal rotation axis.

In FIG. 10, another scanning option is introduced in which the cameras 12 of the electro-optical radar (i.e., system 10) are rotating around the horizontal rotation axis 140, thereby scanning sector 160. Preferably, the scanning of this sector 160 is performed by the same method as the vertical scanning.

According to this embodiment of the present invention, the distance of the targets is measured by using radiation emitted or reflected from the target. The location of the target is determined by using triangulation with the two cameras. This arrangement does not use active radiation emission from the radar itself and thus remains concealed while in measurement. The distance measurement accuracy is directly proportional to the pixel object size (the size of the pixel in the object or target plane) and to the target distance and inversely proportional to the distance between the two cameras. The pixel size and the distance between the cameras are two system design parameters. As the distance between the two cameras increases and the pixel size decreases, the distance measurement error decreases.

Another feature of this embodiment is the ability to double-check each target detected, hence achieving a reduction in the number of false alarms. The passive operation allows a reliable detection of such targets with a relatively low false alarm rate and high probability of detection by utilizing both CCD and/or FLIR cameras to facilitate double-checking of each target detected by each camera. Each camera provides an image of the same area but from a different view or angle, thus each detected target at each image from each camera should be in both images. As the system geometry is prior knowledge, hence the geometrical transformation of one image to the other image is known, thus each detected pixel in one image receives a vicinity of pixels in the other image, and each of them may be its disparity pixel. Thus only a pair of such pixels constitutes a valid detection.

From the above description of the system scanning methods, the system display of detected targets may include all the measured features, e.g., target size, distance from the system, azimuth, and altitude. The present invention uses a panoramic image of the scene together with its map of detected targets to present the above features, in a convenient and concise manner.

Figure 11:
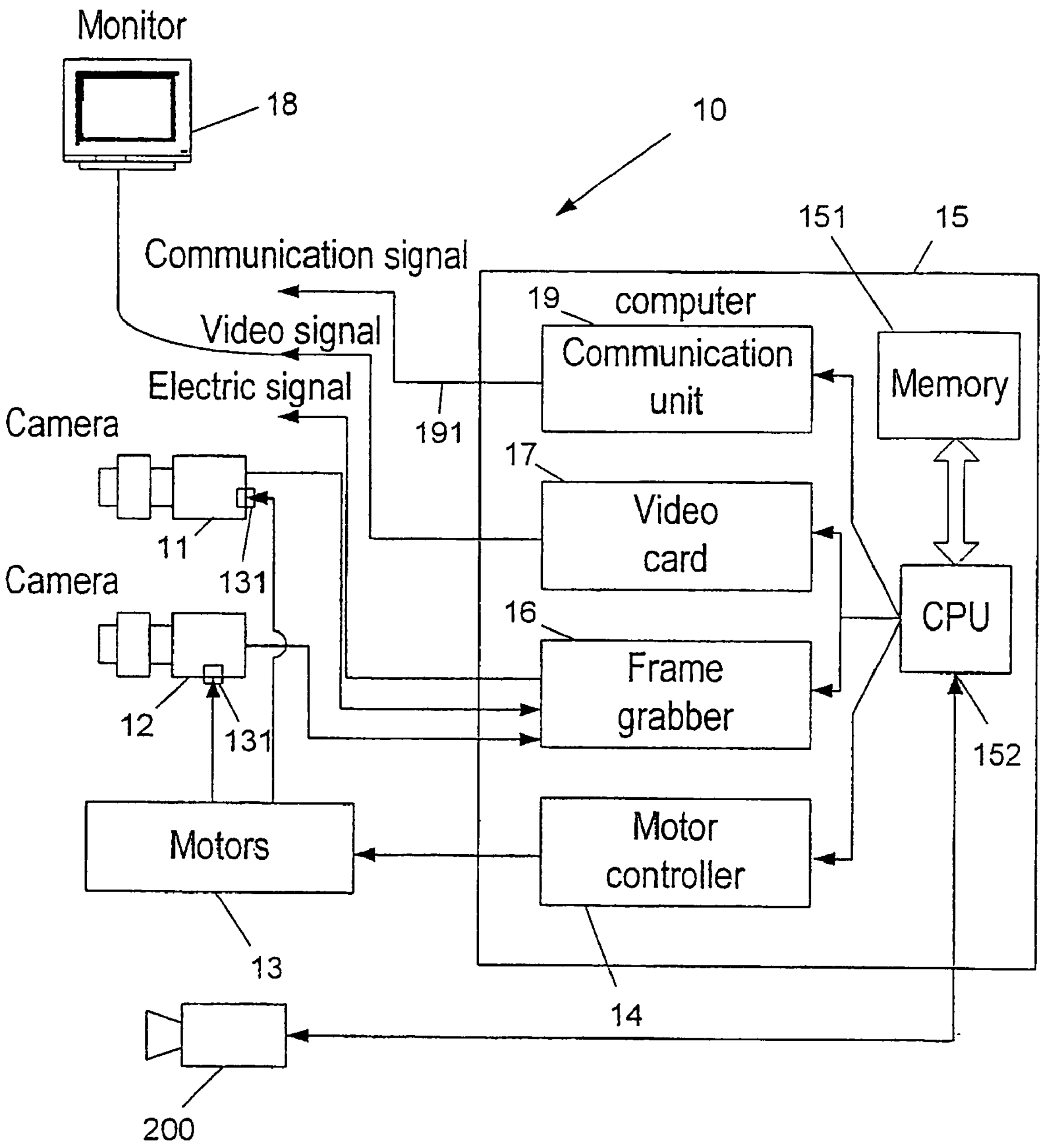
FIG. 11 schematically illustrates the monitoring system of FIG. 1 provided with laser range finder, according to a preferred embodiment of the present invention.

FIG. 11 schematically illustrates the monitoring system of FIG. 1 provided with a laser range finder, according to a preferred embodiment of the present invention. Laser Range Finder 200 is electrically connected to computerized system 15, either via the CPU 152 and/or via the communication unit 19. The laser range finder 200 is used for measuring the distance of a detected object from it, preferably while system 10 monitors a given area. Laser Range Finder 200 transfers to system 10 data representing the distance from a detected object, thereby aiding system 10 to obtain the location of objects and targets. The laser range finder 200 can be any suitable laser range finder device that may be fitted to system 10, such as LDM 800-RS 232-WP industrial distance meter of Laseroptronix, Sweden.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. Method for the monitoring of an environment by use of one or more pairs of imagers, each imager monitoring said environment from a different angle of view, comprising the steps of:

a) providing one or more pairs of imagers, wherein at least one of said pairs comprises an optical imager and at least one of said pairs comprises a Forward Looking Infra Red (FLIR) imager;
b) positioning both imagers of said one or more pairs of imagers on a common vertically oriented pole such that they are located at a distance of 0.5 to 50 meters from each other and capture a same object at a different angle of view, in order to perform a vertical stereoscopic observation of objects;
c) defining and storing in a memory, programs for processing, in real-time, photographic data to be obtained from the stereoscopic observation of objects by use of said one or more pairs of imagers;
d) determining and storing parameters according to which the observation of a controlled space or sections thereof is effected;
e) carrying out an unmanned, real-time vertical stereoscopic observation of said controlled space or sections thereof, according to the observation parameters;
f) determining the distance to said observed objects from said one or more pairs of imagers;
g) evaluating the size of each of said observed objects;
h) classifying a type and degree of danger of each of said observed objects by jointly processing said real-time data obtained from said stereoscopic observation with respect to the angle of view of each of said imagers, the path and size of, and distance from, said observed objects, and said stored danger parameters; and
i) providing an indication when one or more of said observed objects is approaching said controlled space and has been classified as having a sufficiently high degree of danger so as to be liable of damaging an authorized body within said controlled space.

2. Method according to claim 1, further comprising:

a) changing the sections of said stereoscopic observation so as to monitor the path of any detected dangerous objects;
b) receiving and storing the data defining the positions and the foreseen future path of all authorized bodies;
c) extrapolating the data obtained by monitoring the path of any detected dangerous objects to determine an assumed future path of said objects; and
d) comparatively processing said assumed future path with the foreseen future path of all authorized bodies, to determine the possible danger of collision or intrusion.

3. Method according to claim 2, further comprising determining an action on dangerous objects that will eliminate the danger of collision, intrusion or damage.

4. Method according to claim 3, wherein the action is the destruction of the dangerous object.

5. Method according to claim 3, wherein the action is change in their assumed future path the dangerous object.

6. Method according to claim 2, further comprising determining an action on an authorized body that will eliminate the danger of collision, intrusion or damage.

7. Method according to claim 6, wherein the action is a delay in the landing or take-off of an aircraft or a change of the landing or take-off path of said aircraft.

8. Method according to claim 1, wherein the indication is an alarm signaling the presence and nature of any dangerous objects, the danger of collisions and possible desirable preventive actions.

9. Method according to claim 1, wherein the stereoscopic observation is carried out by performing the steps of:

a) modifying the angle of one or more imagers;
b) capturing one or more images with said of one or more imagers;
c) processing said captured one or more images by a computerized system; and
d) repeating steps a) to c).

10. Method according to claim 9, wherein the stereoscopic observation is carried out as a continuous scan or segmental scan.

11. Method according to claim 1, wherein the processing of the real-time photographic data comprises the steps of:

a) setting initial definition for the stereoscopic observation and for the processing of the data of said stereoscopic observation;
b) storing in the memory the data that represent the last captured one or more images at a specific angle of the imagers; and
c) processing said data for detecting suspected objects, by performing, firstly, pixel processing and secondly, logical processing; and
d) deciding whether said suspected object is a dangerous object.

12. Method according to claim 11, wherein the pixel processing comprises the steps of:
a) mathematically processing each pixel in a current photo for detecting suspected objects; and
b) whenever a suspected object is detected, providing images at the same time period and of the same monitored section by means of both imagers of the one or more pairs of imagers for generating three-dimensional data related to said suspected object.

13. Method according to claim 12, wherein whenever the pixel processing detects a moving object, further comprising the steps of:
a) comparing the current images to an average image generated from the previous stored images, said previous stored images and said current image being captured at the same imager angle;
b) generating a comparison image from the difference in the pixels between said average image said current image, each pixel in said comparison image representing an error value;
c) comparing each error value to a threshold level, said threshold level being dynamically determined to each pixel in the image matrix statistically according the previous pixel values stored in the memory as a statistic database;
d) whenever a pixel value in said comparison image exceeds said threshold level, generating a logic matrix in which the location of said pixel value is set to a predetermined value; and
e) upon completing comparing each error value to said threshold level, for the entire current images, transferring said generated logic matrix to the logic process stage.

14. Method according to claim 12, wherein whenever the pixel processing detects a static object, further comprising the steps of:
a) generating an average image from the current one or more images;
b) generating a derivative matrix from said average image for emphasizing relatively small objects at each image from said one or more images, which might be potential dangerous objects;
c) storing said derivative matrix in the memory as part of an image database, and comparing said derived matrix with a previous derivative matrix stored in said memory as part of said image database, said previous derivative matrix being derived from one or more images that was taken from the exact imager angle as of said average image;
d) from the comparison, generating an error image, wherein each pixel in said error image represents the error value between said derivative matrix and said previous derivative matrix;
e) comparing the value of each pixel from said error image to a threshold level, said threshold level being dynamically determined to each pixel in the error image statistically according the previous pixel values stored in the memory as a part of a statistic database;
f) whenever a pixel value in said error image exceeds said threshold level, generating a logic matrix in which the location of said pixel value is set to a predetermined value; and
g) upon completing comparing each error value to said threshold level, for the entire current images, transferring said generated logic matrix to the logic process stage.

15. Method according to claim 11, wherein the logic processing comprises the steps of:
a) measuring parameters regarding the pixels in the logic matrix;
b) comparing said measured parameters to a predetermined table of values stored in the memory, whenever said measured parameters equal to one or more values in said table, the pixels that relates to said measurement are dangerous objects.

16. Method according to claim 15, wherein the parameters are selected from the group consisting of the dimension of an adjacent group of pixels, the track that one or more adjacent pixels created in the logic matrix, direction, speed, size and location of an object that is created from a group of pixels.

17. Method according to claim 1, further comprising rotating both imagers of a pair of imagers and simultaneously changing their corresponding angle of view.

18. Method according to claim 17, further comprising providing at least one encoder and at least one reset sensor for determining the angle of each imager, said encoder and reset sensor being provided to each axis that rotates an imager.

19. Method according to claim 18, wherein the reset sensor provides the initiation angle of the imager at the beginning of the scanning of a sector and the encoder provides the current angle of the imager during the scanning of the sector.

20. Method according to claim 1, further comprising the steps of:
a) generating a panoramic image and a map of the monitored area by scanning said area, said scanning being performed by rotating at least a pair of distinct and identical imagers around their central axis of symmetry;
b) obtaining the referenced location of a detected object by observing said object with said imagers, said location being represented by the altitude, range and azimuth parameters of said object; and
c) displaying the altitude value of said object on said panoramic image and displaying the range and the azimuth of said object on said map.

21. Method according to claim 20, wherein the imagers are selected from the group consisting of optical imagers, thermal imagers, CCD cameras, CMOS based cameras, and Forward Looking Infra Red (FLIR) cameras.

22. Method according to claim 20, wherein the distance, in an angle, between each two imagers is between 0.5 to 50 meters.

23. Method according to claim 20, wherein the imagers are not identical and do not share common central axis of symmetry or of optical magnification but have at least an overlapping part of their field of view.

24. Method according to claim 1, further comprising documenting the activities of the wildlife and other dangerous objects, for preventing and reducing from said wildlife and said other dangerous objects to appear at the monitored area.

25. Method according to claim 1, further comprising procuring, adjourning and storing in a memory file representing a background space.

26. Apparatus for the monitoring an environment by use of one or more pair of imagers, each imager monitoring said environment from a different angle of view, comprising:

a) one or more pairs of imagers for obtaining real-time photographic data of a controlled space or sections thereof, wherein both imagers of said one or more pairs of imagers are positioned along a common vertically oriented pole and are vertically spaced by a distance of 0.5 to 50 meters from each other, for performing an unmanned vertical stereoscopic observation of objects by capturing a same object at a different angle of view;

b) memory means in which are stored boundary parameters of a controlled space or sections thereof, danger parameters of observed objects and real-time photographic data processing instructions; and c) a processing unit, operable to:

i. jointly process real-time photographic data obtained from said stereoscopic observation, with respect to the angle of view of each of said imagers and according to said instructions;

ii. determine the distance to said observed objects from said one or more pairs of imagers;

iii. evaluate the size of each of said observed objects;

iv. classify a type and degree of danger of each of said observed objects according to said processed photographic data, the path and size of, and distance from, said observed objects, and said stored danger parameters; and v. provide an indication when one or more of said observed objects is approaching said controlled space and has been classified as having a sufficiently high degree of danger so as to be liable of damaging an authorized body within said controlled space, wherein at least one of said pairs comprises an optical imager and at least one of said pairs comprises a Forward Looking Infra Red (FUR) imager.

27. Apparatus according to claim 26, wherein the imagers are photographic devices selected from the group consisting of: CCD or CMOS cameras, infrared cameras, and Forward Looking Infra Red (FLIR) cameras.

28. Apparatus according to claim 26, wherein both imagers of a pair of imagers are identical.

29. Apparatus according to claim 26, wherein both imagers of a pair of imagers are provided with a different lens.

30. Apparatus according to claim 26, further comprising:

a) elaborator means for obtaining the referenced location of a detected object in said controlled space, said location being represented by the altitude, range and azimuth parameters of said object;

b) means for generating a panoramic image and a map of the monitored area;

c) means for displaying the altitude value of said object on said panoramic image and means for displaying the range and the azimuth of said object on said map.

31. Apparatus according to claim 30, wherein the means for displaying the monitored area comprise three-dimensional software graphics for indicating the location of each detected object as a three-dimensional image.

32. Apparatus according to claim 30, wherein the elaborator means comprise one or more dedicated algorithm installed within a computerized system.

33. Apparatus according to claim 26, further comprising a laser range finder being electrically connected to a computerized system for measuring the distance of a detected object from said laser range finder, said laser range finder transfers to said computerized system data representing the distance from a detected object, thereby aiding said computerized system to obtain the location of said detected object.

34. Apparatus according to claim 26, further comprising a set of motors for displacing the imagers, for changing the controlled space or sections thereof, and for thereby generating the real-time photographic data.

* * * * *